United States Patent [19]
Williams

[11] Patent Number: 5,217,512
[45] Date of Patent: Jun. 8, 1993

[54] APPARATUS FOR FILTERING DEBRIS FROM A MOVING AIRSTREAM

[75] Inventor: Roger D. Williams, Dallas, N.C.

[73] Assignee: Pneumafil Corporation, Charlotte, N.C.

[21] Appl. No.: 890,527

[22] Filed: May 28, 1992

[51] Int. Cl.$^5$ .............................................. B01D 46/04
[52] U.S. Cl. ............................... 55/272; 55/290; 55/292; 55/304
[58] Field of Search ................... 55/96, 213, 271, 272, 55/270, 290, 291, 284, 304, 390

[56] References Cited

U.S. PATENT DOCUMENTS

| | | |
|---|---|---|
| 2,594,957 | 4/1952 | Martens, Jr. . |
| 2,634,560 | 4/1953 | Ramm . |
| 3,147,098 | 9/1964 | Honan et al. . |
| 3,183,647 | 5/1965 | Lang ................................. 53/294 X |
| 3,306,012 | 2/1967 | Wallin . |
| 3,339,348 | 9/1967 | Bratton et al. . |
| 3,345,805 | 10/1967 | Sherrill . |
| 3,505,792 | 4/1970 | Dahlem . |
| 4,045,194 | 8/1977 | Ferri ................................. 55/290 |
| 4,203,738 | 5/1980 | Kerman . |
| 4,253,855 | 3/1981 | Jackson et al. ................... 55/290 |
| 4,345,353 | 8/1982 | Sommerfeld .................... 55/304 X |
| 4,689,143 | 8/1987 | Miers .............................. 55/290 X |
| 4,725,292 | 2/1988 | Williams . |
| 4,814,076 | 3/1989 | Jackson ........................... 55/290 X |
| 4,842,624 | 6/1989 | Barton ............................. 55/291 |
| 4,971,026 | 11/1990 | Fineblum ........................ 55/290 X |

FOREIGN PATENT DOCUMENTS 1017890 10/1957 Fed. Rep. of Germany .
1009993 11/1965 United Kingdom .

*Primary Examiner*—Charles Hart
*Attorney, Agent, or Firm*—Shefte, Pinckney & Sawyer

[57] ABSTRACT

An improved air filtration apparatus of the rotary prefilter type having a rotating filter screen disposed in a wall of the filter housing is equipped with a constricted suction nozzle which is reciprocable radially across the rotating filter surface to remove debris accumulated thereon. Operation of the suction nozzle is controlled in relation to the pressure drop across the filter to maintain the pressure drop within a predetermined desired range.

9 Claims, 4 Drawing Sheets

APPARATUS FOR FILTERING DEBRIS FROM A MOVING AIRSTREAM

BACKGROUND OF THE INVENTION

The present invention relates generally to apparatus for filtering debris from a moving airstream and, more particularly, to air filtration apparatus for use in cleaning lint and dust laden air within textile mills.

In textile mills and other similar industrial settings where airborne lint, dust and other debris can be problematic, it is common practice to filter the ambient air on a continuing basis, one typical filtration system arrangement utilizing a series of filtration units of increasing efficiency. In filtration systems of this type, the initial filtration unit is commonly referred to as a prefilter or a rough filter in that the unit is equipped with a relatively coarse filtering media adapted primarily to remove larger pieces of lint and like fibrous debris and other relatively heavy dust and debris particles but not to completely clean the airstream passing through the filter.

One of the most common forms of such prefilters or rough filters is a so-called rotary disk filter wherein a circular filter element is rotatably supported within a correspondingly circular airflow opening in an otherwise impervious filter frame wall for axial airflow through the circular filter element. While it is considered to be desirable to maintain some accumulation of separated lint and debris on the filter element to enhance its filtration efficiency, excessive build-up of lint and debris is equally undesirable and, accordingly, prefilters are characteristically provided with some means for at least periodically removing a portion of the lint and debris accumulation from the filter medium. For this purpose, rotary disk-type prefilters may be equipped at the so-called dirty side of the filter element with a stationary suction nozzle having an elongated intake slot extending the full radius of the filter element to continuously withdraw accumulated lint and debris from the filter element as it rotates during operation.

While suction cleaning nozzles of this type are generally effective for their intended purpose in the operation of rotary disk prefilters, they suffer the disadvantage that a relatively powerful fan motor must be provided to exert sufficient suction along the entire length of the intake slot in order to achieve acceptable cleaning of the filter element over its entire radius and surface area and, therefore, such filter cleaning arrangements do not always achieve an optimal degree of cleaning efficiency which, in turn, can make it difficult to maintain a desirable pressure drop across the filter element and ultimately results in a shorter filter element life.

SUMMARY OF THE INVENTION

It is accordingly an object of the present invention to provide an improved cleaning arrangement for use in a rotary disk-type prefilter of the aforementioned type, which will provide sufficiently increased cleaning effectiveness to enable the pressure drop across the filter element to be maintained substantially constantly within a predetermined desirable range.

The cleaning arrangement of the present invention is basically adapted to be incorporated in substantially any debris filtering apparatus of the type having a frame which defines a circular airstream passageway with a circular filter element disposed within the passageway for separating debris from a moving airstream passing through the filter element. Basically, the cleaning arrangement of the present invention includes a mechanism for rotating the filter element and a suction assembly utilizing a nozzle having an inlet opening disposed adjacent the filter element for removing separated debris from the filter element.

According to the present invention, the inlet opening of the nozzle is dimensioned to be substantially smaller than the radial and annular dimensions of the filter element and thereby to have a substantially constricted inlet area in relation to the surface area of the filter element. An associated mechanism is provided for oscillating the nozzle for traveling movement of its inlet opening reciprocably across the full radial dimension of the filter element. In this manner, the constricted inlet opening serves to concentrate the force of suction exerted through the nozzle and, as a result, a less powerful fan motor can be utilized to generate the necessary suction force while still providing more effective filter cleaning in comparison to conventional stationary cleaning nozzle arrangements of the type described above.

In the preferred embodiment of the present invention, the suction assembly utilizes a suction arm pivotably mounted at one end to the frame with the nozzle affixed to the other end of the arm and a motor or other suitable means for driving pivotal movement of the suction arm, pivoting movement preferably being transmitted to the arm through a cam to impart a predetermined path of reciprocal movement of the nozzle. Advantageously, this arrangement enables the drive mechanism to be disposed at the side of the frame opposite the suction arm and therefore at the downstream or "clean" side of the filter element. The inlet opening of the nozzle is formed as an elongated slot of a lengthwise dimension less than one-half the radius of the filter element and with its lengthwise dimension oriented radially relative to the filter element.

The present filtering apparatus also preferably includes a control arrangement for selectively varying cleaning operation of the suction assembly in relation to changes in the pressure drop across the filter element as detected by a suitable pressure sensor. In one embodiment, the control arrangement may include a valve or other means for intermittently actuating and deactuating the suction assembly. Alternatively, the control arrangement may utilize a control unit associated with the filter element rotating mechanism for intermittently varying the speed of rotation of the filter element.

DESCRIPTION OF THE PREFERRED EMBODIMENT

Figure 1:
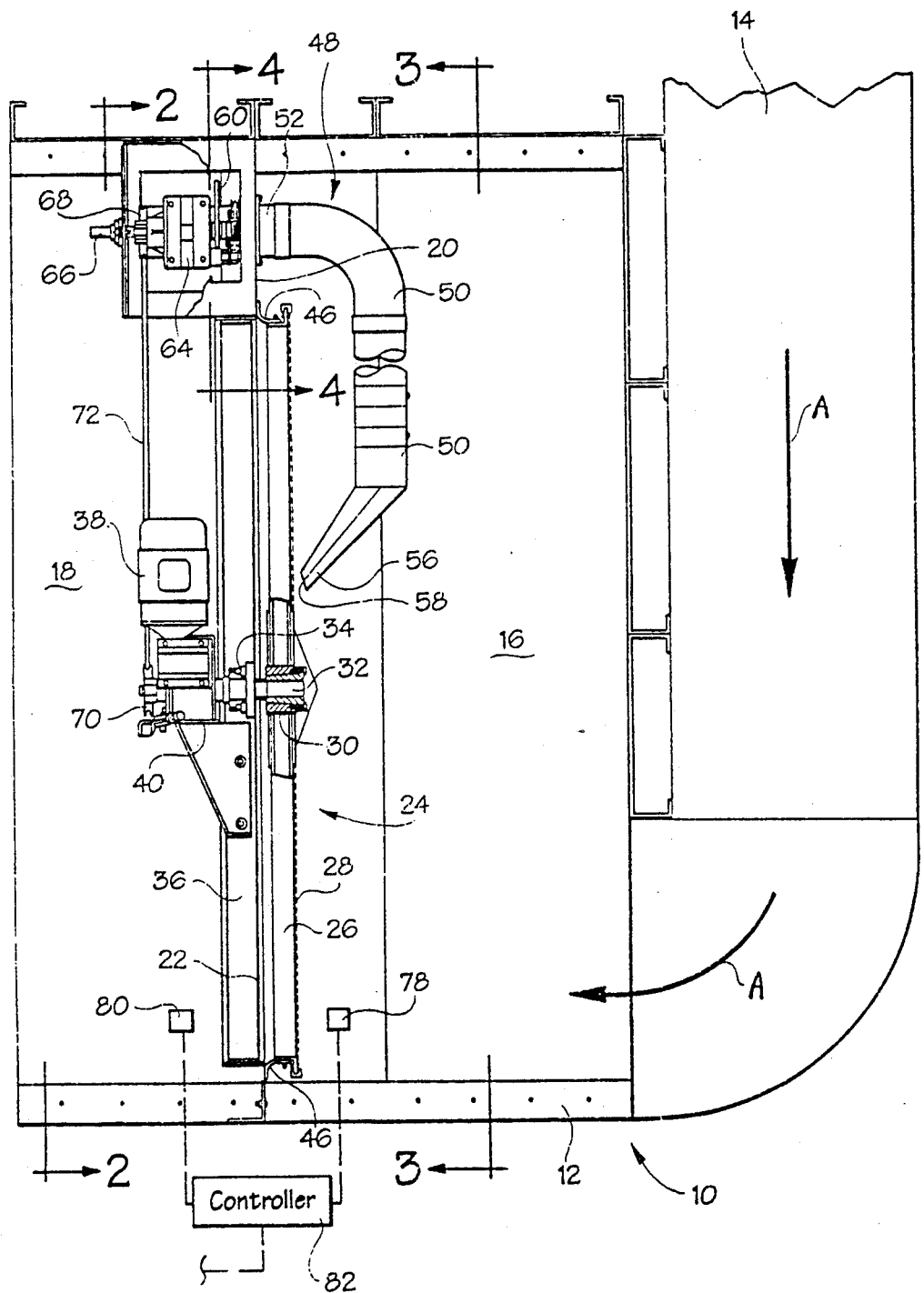
FIG. 1 is a side elevational view of a debris filtering apparatus according to a preferred embodiment of the present invention, shown with one side of the apparatus frame broken away to reveal the interior of the apparatus.
Figure 2:
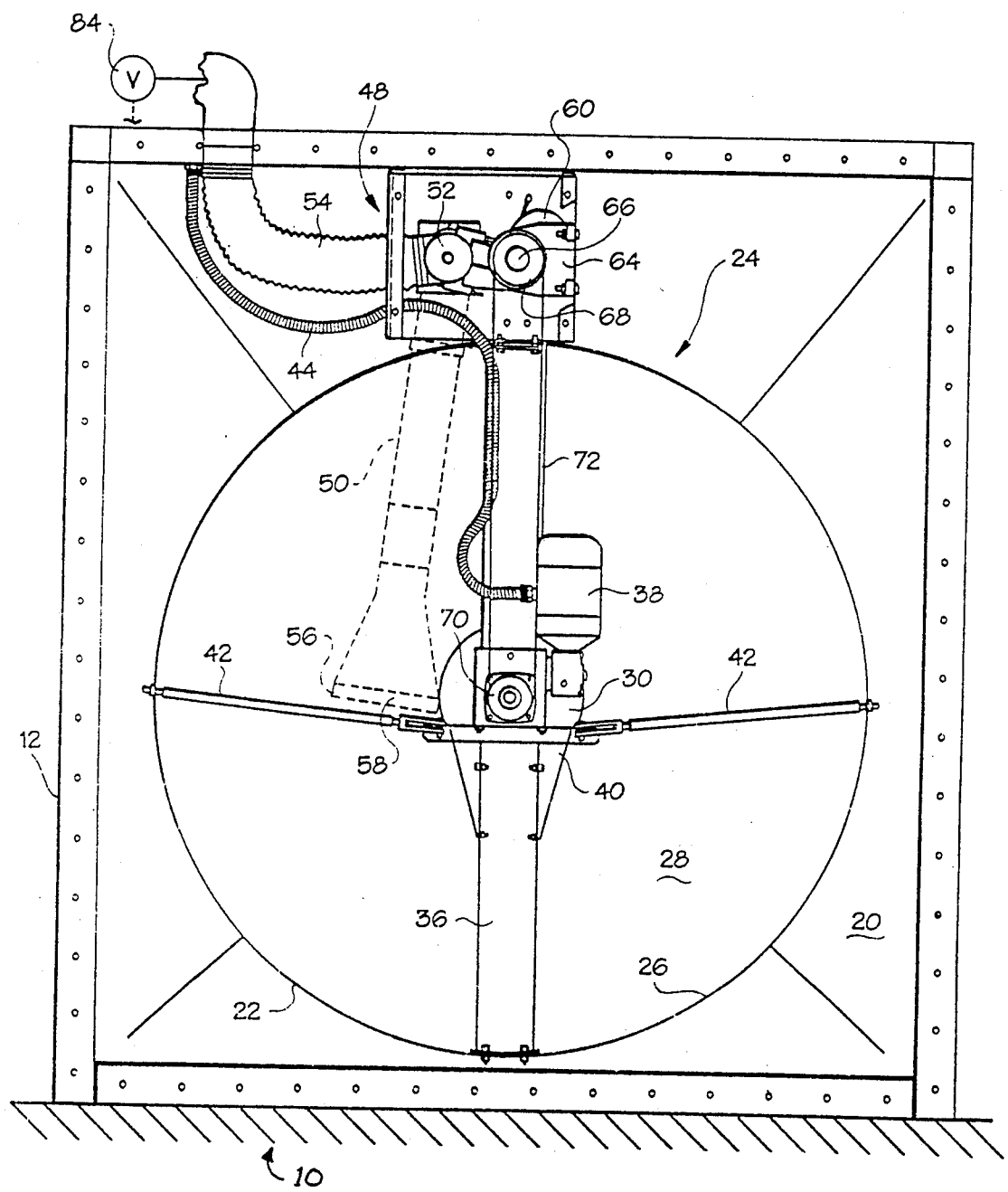
FIG. 2 is a vertical cross-sectional view taken through the filtering apparatus of FIG. 1 along line 2—2 thereof.
Figure 3:
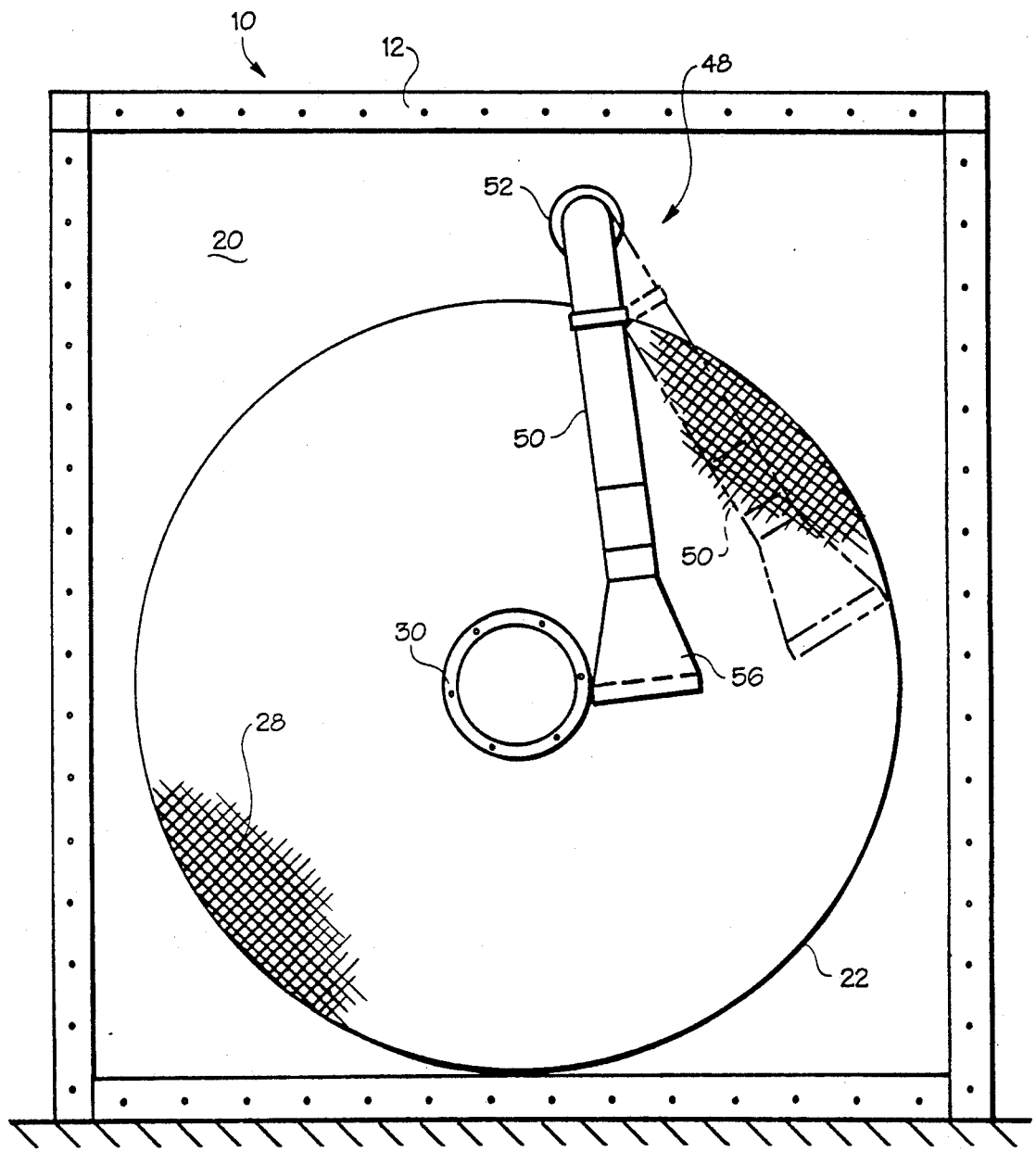
FIG. 3 is another vertical cross-sectional view through the filtering apparatus of FIG. 1, taken along line 3—3 thereof.

Referring now to the accompanying drawings and initially to FIGS. 1-3, an air filtration apparatus of the prefilter or rough filter type according to the preferred embodiment of the present invention is generally indicated at 10. The filtration apparatus 10 basically includes a hollow box-like parallelepiped housing 12 into one end of which a lint and debris-laden airstream, indicated representatively by direction arrows A, is delivered through any appropriate duct or conduit system, representatively indicated at 14, for passage of the airstream A lengthwise through the housing 12 into a downstream duct or conduit system which typically will include one or more successive filtration units (not shown) of increasing filtration efficiency, e.g., conventional drum-type filters. The housing 12 is interiorly divided lengthwise into an upstream "dirty" chamber 16 and a downstream "clean" chamber 18 by a transverse wall 20 which is impervious to air flow except through a central circular opening 22 across which is disposed a substantially coextensive circular filter assembly 24.

The filter assembly 24 basically includes a circular spoke-like frame 26 with a relatively coarse screen-type filtering medium 28, or another suitable "rough" filtering medium, extending in substantially flat open-width disposition across the side of the frame 26 facing the "dirty" chamber 16 and secured to the frame 26 about its peripheral edge. The filter frame 26 is provided with a mounting hub 30 at its axial center, by which the filter assembly 24 is secured to a shaft 32 rotatably supported by a bearing assembly 34 mounted coaxially with the circular opening 22 in the dividing wall 20 by a structural beam 36 affixed to the wall 20 to extend diametrically across the opening 22 at the side of the wall 20 facing the "clean" chamber. The shaft 32 is driven rotatably by a drive motor and transmission assembly 38 supported on a platform 40 mounted to the beam 36, thereby for driving rotation of the filter assembly 24. The platform 40 is stabilized by a pair of adjustable braces 42 which respectively extend from opposite sides of the platform 40 laterally outwardly into connection with the dividing wall 20 adjacent the opening 22. Electrical power for the motor 38 from a suitable source (not shown) is supplied through leads contained in a flexible conduit 44. A flexible circular sealing flange 46 is affixed about the outer periphery of the filter frame 26 to extend into sliding contact with the dividing wall 20 adjacent its opening 22 to seal the filter assembly 24 with respect to the dividing wall 20 and thereby prevent undesirable passage of the airstream A through the annular space between the filter assembly 24 and the wall 20.

As will be understood, in normal operation, the airstream A will be laden with entrained lint, dust particles, and other debris as the airstream enters the dirty chamber 16 of the filter housing 12 from the delivery duct 14. As the airstream A passes through the filter screen 28 of the filter assembly 24, the coarse nature of the screen 28 is effective to separate and collect the larger fibers and debris particles on the surface of the screen 28 facing the "dirty" chamber 16. As debris accumulates on the filter screen 28, its filtering efficiency progressively increases. It is conventionally considered to be desirable up to a point to maintain a matt of accumulated debris on the filter screen 28 to obtain a desirable degree of filtration at the prefilter stage. However, since the filtration apparatus 10 in its function as a prefilter is intended merely to perform a "rough" degree of cleaning of the airstream A, a significant buildup of accumulated debris is unnecessary to maintain. Further, at some point, an excessive thickness of the matt of accumulated debris on the screen 28 begins to create an undesirably high pressure drop across the filter screen 28 between the dirty and clean chambers 16,18 and unduly reduces the rate of air flow through the overall filtration system below a desirable level. Accordingly, the filtration apparatus 10 additionally includes a suction cleaning assembly, indicated in its entirety at 48, for removing accumulated debris from the face of the filter screen 28 so as to maintain the pressure drop across the filter screen 28 within a predetermined desirable range.

The suction cleaning assembly 48 includes a tubular sleeve 52 rotatably mounted within an opening formed in the upper end of the dividing wall 20 with opposite ends of the sleeve 52 protruding into the dirty and clean chambers 16,18. The end of the sleeve 52 within the "clean" chamber 18 communicates with a flexible conduit 54 which extends therefrom to a vacuum fan or blower or other suitable source of suction force (not shown), while the end of the sleeve 52 projecting into the "dirty" chamber 16 has a suction arm 50 fitted thereto for rotational movement integrally with the sleeve 52. The suction arm 50 extends downwardly from the sleeve 52 and terminates in a tapered nozzle 56 which faces toward and in close adjacency to the surface of the filter screen 28 at a location laterally adjacent the central hub 30 of the filter assembly 24. The nozzle 56 defines a narrow elongated intake slot 58 oriented with its longitudinal dimension extending substantially radially with respect to the filter screen 28. Each dimension of the slot 58 is selected to be substantially smaller than the corresponding radial and annular dimension of the filter screen 28, the lengthwise dimension of the slot 58 preferably being less than one-half the radial dimension of the filter screen 28 and the transverse lateral dimension of the slot 58 being substantially narrow in comparison to its lengthwise dimension.

By virtue of the mounting of the suction arm 50 and its nozzle 56 to the rotatable sleeve 52, the suction arm 50 and the nozzle 56 are pivotable with the sleeve 52 in an arcuate path of reciprocal movement which traverses the face of the filter screen 28 substantially radially thereacross, as depicted by the full-line and broken-line positions of the suction arm 50 shown in FIG. 3.

Figure 4:
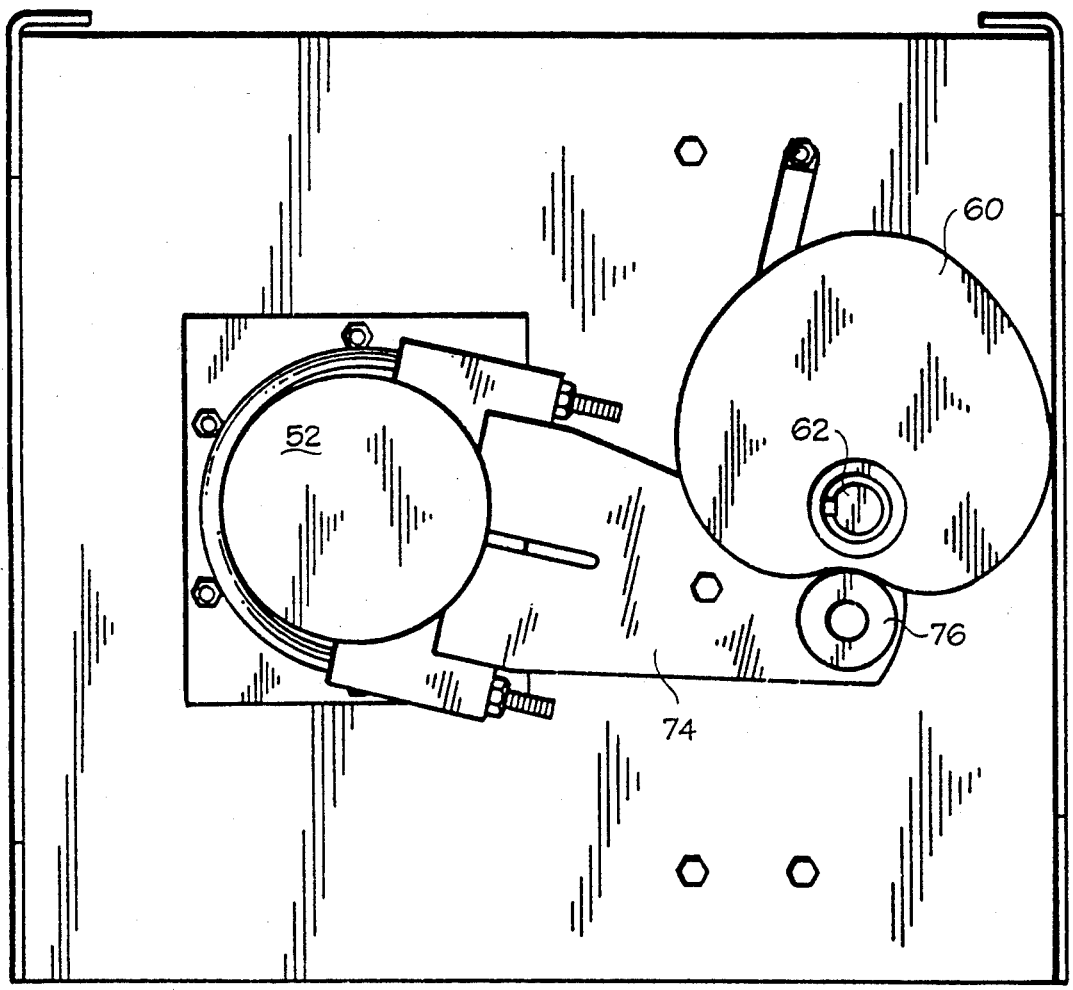
FIG. 4 is a vertical cross-sectional view through the suction arm drive mechanism of the apparatus of FIG. 1, taken along line 4—4 thereof.

Pivoting reciprocal movement of the suction arm 50 between the positions shown in FIG. 3 is driven by the filter assembly motor 38 via a belt-driven cam arrangement best seen in FIGS. 2 and 4. As shown in FIG. 4, a heart-shaped cam 60 is rotatably mounted on an output shaft 62 of a helical gear reduction unit 64 mounted to the dividing wall 20 within the "clean" chamber 18 laterally adjacent the rotatable suction sleeve 52. An input shaft 66 of the gear reduction unit 64 carries a pulley 68 which is driven by a corresponding pulley 70 on the filter assembly shaft 32 via an endless drive belt 72 trained about the pulleys 68,70. A radial arm 74 is affixed to the suction assembly sleeve 52 and supports a cam follower roller 76 in following relation to the peripheral profile of the cam 60 for transmitting reciprocal rotation to the sleeve 52 and in turn reciprocal pivoting movement to the suction arm 50 and its nozzle 56. As will thus be understood, upon energization of the aforementioned suction source connected to the flexible suction conduit 54, a vacuum prevails at the intake slot 58 of the suction nozzle 56 effective to progressively remove accumulated lint and debris from the surface of the filter screen 28 as the suction arm 50 reciprocates and the filter assembly 24 simultaneously rotates. The rotational speed of the filter assembly 24 and the reciprocation of the suction arm 50 are coordinated to ensure that the suction nozzle 56 traverses the entire surface area of the filter screen 28 on a repeating basis over a predetermined number of revolutions of the filter assembly 24.

In order to control operation of the suction cleaning assembly 48 in relation to the prevailing pressure drop across the filter screen 28, suitable pressure sensors, shown only representatively at 78,80, are disposed within the "dirty" and "clean" chambers 16,18, respectively, for detecting the prevailing air pressure in each chamber and the sensors 78,80 are connected to a common control unit, only representatively shown at 82, which stores a control program for operation of the suction cleaning assembly 48. According to one contemplated embodiment, a valve, schematically shown at 84, is provided in the flexible suction conduit 54 for selective opening and closing movement to control communication between the suction arm 50 and the suction source, the control unit 82 being connected with the valve 84 and programmed to open the valve 84 when the pressure differential between the dirty and clean chambers 16,18 as detected by the sensors 78,80 exceeds a predetermined maximum value, whereby the suction cleaning assembly 48 is actuated for removing accumulated debris from the filter screen 28, and to close the valve 84 and deactuate the suction cleaning assembly 48 when the pressure differential reaches a predetermined minimum value as a result of the removal of accumulated debris. Alternatively, the control unit 82 may be connected to the electrical power supply to the drive motor 38 to vary an appropriate characteristic of the electrical power supply, e.g., its cycles per unit time, to selectively increase and decrease the rotational speed of the filter assembly 24 and the rate of reciprocation of the suction arm 50 in relation to increases and decreases in the pressure differential across the filter screen 28. In either case, the suction cleaning assembly 48 is effectively controlled to maintain the pressure drop across the filter screen 28 within a predetermined desired range.

The oscillating suction cleaning assembly 48 of the present invention provides several distinct advantages over the above-described stationary suction cleaning assemblies used in conventional prefilters. First, the constricted configuration of the nozzle 56 and its intake slot 58 serves to substantially concentrate the suction force applied through the suction cleaning assembly 48, which provides a greater cleaning effectiveness in removing accumulated debris from the filter screen 28 in comparison to stationary cleaning nozzles which extend the full radial dimension of the filtering medium of a conventional prefilter. In turn, if desirable, a less powerful suction fan or blower may be utilized, which contributes to reducing the ongoing expenses of operating the prefilter without any loss of filtration efficiency or effectiveness. Further, because the suction control arrangement of the present invention effectively enables the pressure drop across the filter screen to be maintained generally constant within a predetermined range, the life of the filter screen 28 is extended and it is contemplated that it may also be possible to reduce the number of downstream filters following the prefilter while still accomplishing the same desired degree of overall filtration as with conventional filtering systems.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. Apparatus for filtering debris from a moving airstream comprising a frame defining a circular airstream passageway, a circular filter element disposed within said passageway for separating debris from the airstream, and means for cleaning said filter element, said cleaning means comprising means for rotating said filter element and suction means for removing separated debris from said filter element, said suction means including a movable suction arm pivotably mounted to said frame and a nozzle at one end of said suction arm having an inlet opening disposed adjacent said filter element, said inlet opening of said nozzle being of dimensions substantially smaller than the radial and the annular dimensions of said filter element to have a substantially constructed inlet area in relation to the surface area of said filter element, and means for oscillating said nozzle for traveling movement of said inlet opening reciprocably across arm and cam means for variably transmitting pivoting movement to said suction arm.

2. Filtering apparatus according to claim 1, wherein said driving means is disposed at a side of said frame opposite said suction arm to be downstream of said filter element.

3. Filtering apparatus according to claim 1, wherein said inlet opening of said nozzle is an elongated slot of a lengthwise dimension less than one-half the radius of said filter element with its lengthwise dimension oriented radially relative to said filter element.

4. Filtering apparatus according to claim 1 and further comprising control means for selectively varying cleaning operation of said suction means.

5. Filtering apparatus according to claim 5, wherein said control means comprises pressure sensor means to detect the prevailing pressure drop across said filter element and control means for varying said cleaning operation of said suction means in relation to changes in the pressure drop.

6. Filtering apparatus according to claim 4, wherein said control means comprises means for intermittently actuating and deactuating said suction means.

7. Filtering apparatus according to claim 4, wherein said control means comprises means operatively associated with said rotating means for intermittently varying the speed of rotation of said filter element.

8. Apparatus for filtering debris from a moving airstream comprising a frame defining a circular airstream passageway, a circular filter element disposed within said passageway for separating debris from the airstream, and means for cleaning said filter element, said cleaning means comprising means for rotating said filter element and suction means for removing separated debris from said filter element, said suction means including a nozzle having an inlet opening disposed adjacent said filter element, said inlet opening of said nozzle being of dimensions substantially smaller than the radial and the annular dimensions of said filter element to have a substantially constricted inlet area in relation to the surface area of said filter element, said inlet opening of said nozzle being an elongated slot of a lengthwise dimension less than one-half the radius of said filter element with its lengthwise dimensions oriented radially relative to said filter element, and means for oscillating said nozzle for traveling movement of said inlet opening reciprocally across the full radial dimension of said filter element.

9. Apparatus for filtering debris from a moving airstream comprising a frame defining a circular airstream passageway, a circular filter element disposed within said passageway for separating debris from the airstream, and means for cleaning said filter element, said cleaning means comprising means for rotating said filter element and suction means for removing separated debris from said filter element, said suction means including a nozzle having an inlet opening disposed adjacent said filter element, said inlet opening of said nozzle being of dimensions substantially smaller than the radial and the annular dimensions of said filter element to have a substantially constricted inlet area in relation to the surface area of said filter element, means for oscillating said nozzle for traveling movement of said inlet opening reciprocably across the full radial dimension of said filter element, and control means for selectively varying cleaning operation of said suction means, said control means comprising means operatively associated with said rotating means for intermittently varying the speed of rotation of said filter element.

* * * * *